(12) United States Patent
Izadian

(10) Patent No.: US 8,878,384 B2
(45) Date of Patent: Nov. 4, 2014

(54) CENTRAL WIND TURBINE POWER GENERATION

(75) Inventor: Afshin Izadian, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 234 days.

(21) Appl. No.: 13/517,231

(22) PCT Filed: Dec. 23, 2010

(86) PCT No.: PCT/US2010/061972
§ 371 (c)(1),
(2), (4) Date: Jun. 19, 2012

(87) PCT Pub. No.: WO2011/079246
PCT Pub. Date: Jun. 30, 2011

(65) Prior Publication Data
US 2013/0127166 A1    May 23, 2013

Related U.S. Application Data

(63) Continuation of application No. 61/289,423, filed on Dec. 23, 2009.

(51) Int. Cl.
*F03D 9/00* (2006.01)
*H02P 9/06* (2006.01)

(52) U.S. Cl.
CPC ............... *F03D 9/002* (2013.01); *Y02E 10/725* (2013.01); *F03D 9/001* (2013.01); *H02P 9/06* (2013.01)
USPC ............................................. 290/55; 290/54

(58) Field of Classification Search
USPC ............................... 290/42, 43, 53, 54, 44, 55
See application file for complete search history.

(56) References Cited

U.S. PATENT DOCUMENTS 4,694,189 A * 9/1987 Haraguchi et al. .......... 290/40 C
4,904,161 A * 2/1990 Kamide et al. .................. 417/22
(Continued)

FOREIGN PATENT DOCUMENTS

KR   10-2009-0086859          8/2009
WO   WO 2009107132 A2 *       9/2009

OTHER PUBLICATIONS

International Search Report and Written Opinion of the International Searching Authority corresponding to PCT Application No. PCT/US2010/061972, Seo-gu, Daejeon, Korea, Sep. 15, 2011 (9 pages).

(Continued)

*Primary Examiner* — Tulsidas C Patel
*Assistant Examiner* — Viet Nguyen
(74) *Attorney, Agent, or Firm* — Maginot Moore & Beck LLP

(57) ABSTRACT

A wind power conversion apparatus for efficiently generating electric power is disclosed. The apparatus includes at least one blade, the at least one blade being configured to rotate when exposed to wind, a fluid pump mechanically coupled to the at least one blade and configured to pressurize fluid from a low pressure fluid to a high pressure fluid, a fluid motor fluidly coupled to the fluid pump and configured to rotate an output shaft in response to the high pressure fluid and thereby providing the low pressure fluid, and an electric generator mechanically coupled to the fluid motor and configured to generate electric power in response to the rotation of the output shaft of the fluid motor.

9 Claims, 4 Drawing Sheets

(56) References Cited

U.S. PATENT DOCUMENTS

| | | | |
|---|---|---|---|
| 7,863,767 B2 * | 1/2011 | Chapple et al. | 290/54 |
| 7,932,620 B2 * | 4/2011 | Plant, Jr. | 290/55 |
| 8,030,790 B2 * | 10/2011 | Kamenov | 290/43 |
| 8,080,888 B1 * | 12/2011 | Daley | 290/43 |
| 2007/0024058 A1 * | 2/2007 | McClintic | 290/44 |
| 2009/0230688 A1 | 9/2009 | Torres et al. | |
| 2010/0025993 A1 * | 2/2010 | Raftery | 290/42 |
| 2011/0109094 A1 * | 5/2011 | Kenway et al. | 290/55 |
| 2011/0120108 A1 * | 5/2011 | Garmong | 60/398 |
| 2012/0001439 A1 * | 1/2012 | Simon | 290/55 |
| 2012/0161442 A1 * | 6/2012 | Chapple | 290/44 |

OTHER PUBLICATIONS

Oyague, Gearbox Modeling and Load Simulation of a Baseline 750-kW Wind Turbine Using State-of-the-Art Simulation Codes, NREL/TP-500-41160, Feb. 2009, National Renewable Energy Laboratory, Golden, CO.

Rampen, Gearless Transmissions for Large Wind Turbines—The History and Future of Hydraulic Drives, Nov. 2006, Artemis IP Ltd., Scotland.

Van Kooten et al., Wind Power Development: Economics and Policies, Mar. 2009, Policy Working Paper 4868. The World Bank Development Research Group.

Wright et al., Advanced Control Design for Wind Turbines Part 1: Control Design, Implementation, and Initial Tests, NREL/TP-500-42437, Mar. 2009, National Renewable Energy Laboratory, Golden, CO.

Sirouspour et al., On the Nonlinear Control of Hydraulic Servo-systems, Proceedings of the 2000 IEEE International Conference on Robotics & Automation, Apr. 2000, San Francisco, CA.

Lindenberg et al., 20% Wind Energy by 2030: Increasing Wind Energy's Contribution to U.S. Electricity Supply, DOE/GO-102008-2567, Jul. 2008, U.S. Department of Energy, Oak Ridge, TN.

Prabhu et al., Multi Domain Modeling and Simulation of an Electro-Hydraulic System, Society of Automotive Engineers, 06CV-145, Mar. 2006.

Noh et al., Simulator of Water Tank Level Control System Using PID-Controller, International Conference on Water Resources, Hydraulics & Hydrology, World Scientific and Engineering Academy and Society, Feb. 2008, pp. 168-171.

Ji-Zhong et al., Simulation Model of Hydraulic Speed Control System and Its Parameters Identification Based on Resilient Adaptive Particle Swarm Optimization Algorithm, Power and Energy Engineering Conference, Mar. 2010, pp. 1-4.

Ackermann et al., Wind Energy Technology and Current Status: A Review, Renewable & Sustainable Energy Reviews, vol. 4, 2000, pp. 315-374.

Gorbeshko, Development of mathematical models for the hydraulic machinery of systems controlling the moving components of water-development works, Hydrotechnical Construction, vol. 31, Issue 12, 1997, pp. 745-750.

Liu et al., Optimal-tuning nonlinear PID control of hydraulic systems, Control Engineering Practice, vol. 8, Issue 9, Sep. 2000, pp. 1045-1053.

* cited by examiner

CENTRAL WIND TURBINE POWER GENERATION

PRIORITY CLAIM

This application claims priority from U.S. Provisional Application No. 61/289,423 which is entitled "CENTRAL WIND TURBINE POWER GENERATION" and was filed on Dec. 23, 2009. This application claims further priority from international application number PCT/US2010/061972, which is entitled "CENTRAL WIND TURBINE POWER GENERATION" and was filed on Dec. 23, 2010.

TECHNICAL FIELD

The present invention generally relates to power generation and particularly to power generation by wind turbines.

BACKGROUND

In recent years, due to growing global energy needs, sources of energy alternative to fossil fuel have gained significant popularity. Utilization of wind turbines for converting wind power to electrical power is among one of the areas of the alternative energy developments. A wind turbine facility, also commonly referred to as a wind farm, includes a large number of wind turbines. Each wind turbine generates localized electrical power in the form of electric current that is integrated on to an electric grid of the wind turbine facility. The electrical power that is generated by the wind turbine facility is placed on to a regional electric grid.

Traditionally, each wind turbine includes a tower, a series of blades mounted on to a hub, a gear box that is mechanically coupled to the hub, an electric generator that is mechanically coupled to the gear box, a yaw controller for adjusting the direction with which the blades are facing the incident wind, control systems for controlling the electric generator and the yaw controller, and electrical components for interfacing the electric generator to the electric grid of the wind turbine facility. The yaw controller aligns the direction of the wind turbine blades to achieve the highest rotational speed for the blades against a given incident wind. Some of the above mentioned components, such as the hub which is mounted to the blades, the gear box, the electric generator, and the yaw controller are positioned atop the tower. Some of these components, e.g., the electric generator, are heavy. As a result, towers are required to be built in a manner as to support the weight of these components. Further, due to the heavy weight of these components, the yaw controller includes powerful components, e.g., a heavy-duty electric motor for changing the alignment of the blades. Also, due to the heavy weight of these components, the rate at which the yaw controller can adjust the direction of the blades may be slow, making the wind turbine unable to react to an often changing wind direction.

In addition, the electrical power that is generated at the electric generator is in an unregulated form, i.e., varying voltage amplitude and frequencies at varying current levels, in response to the fluctuation of the incident wind. Therefore, electrical power components are required to transform the fluctuating form of the electrical power to a regulated form, i.e., a nearly constant voltage amplitudes sand frequencies at varying current levels. Even with these electrical power components, the generated electrical current placed on transmission lines of the grid of the wind turbine facility may include power flicker which can manifest, e.g., into a visible change in brightness of a lamp due to rapid fluctuations in the voltage.

In addition, electric power losses are realized in the process of converting the unregulated form of electric power to the regulated form.

Also, as mentioned above, each wind turbine in the wind turbine facility generates power locally to the wind turbine. The generated power from each wind turbine must be integrated on to the grid of the wind turbine facility. This integration requires costly electrical power components and advanced controllers to regulate and synchronize the electrical power that is generated by each wind turbine.

Therefore, an efficient way to transform wind power to electrical power is needed in the wind turbine facility that can control and operate each wind turbine, integrate power that is generated by each wind turbine into a central generation unit, and reduce flicker on transmission lines that connect the grid of the wind turbine facility to the regional grid.

SUMMARY

A wind power conversion apparatus for efficiently generating electric power is disclosed. The apparatus includes at least one blade, the at least one blade being configured to rotate when exposed to wind, a fluid pump mechanically coupled to the at least one blade and configured to pressurize fluid from a low pressure fluid to a high pressure fluid, a fluid motor fluidly coupled to the fluid pump and configured to rotate an output shaft in response to the high pressure fluid and thereby providing the low pressure fluid, and an electric generator mechanically coupled to the fluid motor and configured to generate electric power in response to the rotation of the output shaft of the fluid motor.

A wind power electrical power generation system has been developed that makes the generation of electrical power from wind turbines more efficient. The system includes a fluid pump having an input port and an output port, a rotating blade mechanically connected to the fluid pump, a proportional flow valve fluidly coupled to the output port of the fluid pump, a first fluid motor fluidly coupled to the proportional flow valve, a second fluid motor fluidly coupled to the proportional flow valve and configured in parallel with the first fluid motor, a first electrical generator mechanically coupled to the first fluid motor, a second electrical generator mechanically coupled to the second fluid motor, and a proportional integral controller operatively connected to the proportional flow valve. The rotating blade and fluid pump are configured to operate the fluid pump to move fluid from the input port to the output port in response to rotation of the rotating blade. The controller is configured to operate the proportional flow valve with reference to a difference between a set point for a parameter for the first fluid motor and a signal indicative of a current value for the parameter for the first fluid motor.

Another wind power electrical power generation system enables multiple wind turbines to power generation of electrical power by a single electrical generator. The system includes a first fluid pump having an input port and an output port, a first rotating blade mechanically connected to the first fluid pump, a second fluid pump having an input port and an output port, a second rotating blade mechanically connected to the second fluid pump, a proportional flow valve fluidly coupled to the output port of the first fluid pump and to the output port of the second fluid pump, a first fluid motor fluidly coupled to the proportional flow valve, a second fluid motor fluidly coupled to the proportional flow valve and configured in parallel with the first fluid motor, a first electrical generator mechanically coupled to the first fluid motor, a second electrical generator mechanically coupled to the second fluid motor; and a proportional integral controller operatively connected to the proportional flow valve. The first rotating blade and the first fluid pump are configured to operate the first fluid pump to move fluid from the input port to the output port in response to rotation of the first rotating blade. The second rotating blade and the second fluid pump being configured to operate the second fluid pump to move fluid from the input port to the output port in response to rotation of the second rotating blade. The controller is configured to operate the proportional flow valve with reference to a difference between a set point for a parameter for the first fluid motor and the second fluid motor, a signal indicative of a current value for the parameter for the first fluid motor, and a signal indicative of a current value for the parameter for the second fluid motor.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
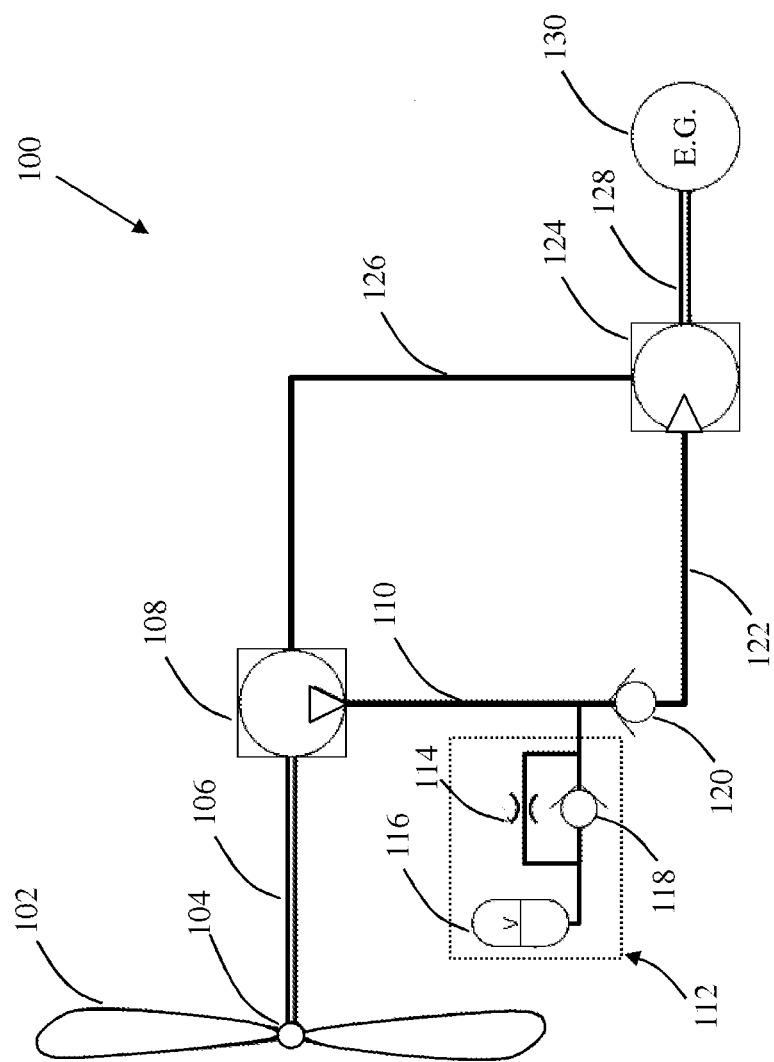
FIG. 1 is a schematic diagram of a wind power generation system.

For a general understanding of the environment for the system and method disclosed herein as well as the details for the system and method, reference is made to the drawings. In the drawings, like reference numerals have been used throughout to designate like elements. The term "fluid pump" refers to any mechanical device that is configured to apply pressure to a fluid. The term "fluid motor" refers to any mechanical device that is configured to perform work in response to receiving pressurized fluid. The term "proportional flow valve" refers to a valve configured to receive an input fluid flow, and to direct portions of the input fluid flow to two or more output fluid flows. The proportional flow valve may adjust the portion of the input flow that is directed to each of the output fluid flows. The term "check valve" refers to a valve that is configured to enable a flow of fluid through a conduit in one direction, and to resist a flow of fluid through the conduit in the opposite direction. The terms "buffer" and "fluid buffering circuit" refer to a fluidic device that is configured to receive fluid with various pressure levels that vary over time. The buffer or fluid buffering circuit is configured to reduce or eliminate the variations in the pressure and output the fluid with a predetermined pressure level.

Referring to FIG. 1, a schematic of a wind power generation system 100 is depicted. The system 100 includes a series of blades 102, a hub 104, a mechanical coupling member 106, a fluid pump 108, a fluid line 110, and a fluid buffering circuit 112. The fluid buffering circuit 112 includes a parallel combination of a flow rate controller 114 and an accumulator 116 (connected in series) and a check valve 118. The system 100 further includes a check valve 120, a fluid line 122, a fluid motor 124, a fluid return line 126, a mechanical coupling member 128, and an electric generator 130. The blades 102 are mounted to the hub 104. The hub 104 is mechanically coupled to the fluid pump 108 via the mechanical coupling member 106. The fluid pump 108 is a device that accepts a mechanical input, e.g., a rotating input shaft, and pressurizes a low pressure fluid input to generate a high pressure fluid output. The fluid pump 108 is fluidly coupled to the fluid buffering circuit 112 and the check valve 120 via the fluid line 110. The fluid line 110 is fluidly coupled to the flow rate controller 114 which is fluidly coupled to the accumulator 116 and to the check valve 118. The check valve 120 is fluidly coupled to the fluid motor 124 via the fluid line 122. The fluid motor 124 is a device that accepts a high pressure fluid as input and produces a mechanical output, e.g., a rotating mechanical output shaft, and a low pressure fluid output. The low pressure fluid output of the fluid motor 124 is fluidly coupled to the low pressure fluid input of the fluid pump 108 via the fluid return line 126. The fluid motor 124 is mechanically coupled to the electric generator 130 via the mechanical coupling member 128.

In operation, wind turns the blades 102, which are mounted at the hub 104. The hub 104 turns the mechanical coupling member 106 which turns the fluid pump 108 and which causes fluid therein to be pressurized. The pressurized fluid is transmitted to the fluid buffering circuit 112. The check valve 120 is also coupled to the pressurized fluid.

Inside the fluid buffering circuit 112, the flow rate controller 114 is coupled to the fluid pump 108 by the fluid line 110. The flow rate controller 114 controls the flow of fluid through the fluid lines inside the fluid buffering circuit 112. The accumulator 116 provides an accumulation function, known in the art. In particular, the accumulator 116 provides a buffering function that substantially removes instantaneous pressure rises in the fluid pressure due to a fluctuating rotation of the blades 102. The check valve 118 prevents pressurized fluid to be transmitted on to the fluid line 110 from the accumulator 116. Therefore, an instantaneous pressure rise inside the fluid line 110 is immediately transferred to the accumulator 116, via the passage way of the check valve 118. Conversely, when the fluid pressure inside the accumulator 116 is higher than the pressure inside the fluid line 110, a controlled transfer of fluid from the accumulator 116 through the flow rate controller 114 to the fluid line 110 occurs. The fluid lines 110 and 122 are isolated from each other in the direction of flow from the fluid pump 108 to the fluid motor 124 by the check valve 120. Therefore, no return flow of fluid is permitted from the fluid motor 124 to the fluid pump 108 or to the fluid buffering circuit 112.

The pressurized fluid inside the fluid line 122 provides a force that enables the fluid motor 124 to rotate the mechanical coupling member 128. In the process of activation of the fluid motor 124, the pressurized fluid in the fluid line 122 performs mechanical work and thereby the pressure of the fluid drops. Fluid with the lowered pressure is returned to the fluid pump 108 via the fluid return line 126. The rotation speed of the fluid motor 124 corresponds to the fluid velocity passing through the motor. Higher fluid pressures can generate higher fluid velocity. As the fluid travels through the fluid motor 124, the mechanical coupling member 128 rotates in response to rotation of the internal components of the fluid motor 124. The mechanical coupling member 128 rotates an input shaft of the electric generator 130, which causes rotation of internal components therein to produce an electric current. A fluid filter, not shown, provides a filtration function to collect debris from internal components of a fluid circuit that form a loop between the fluid pump 108 and the fluid motor 124.

Figure 2:
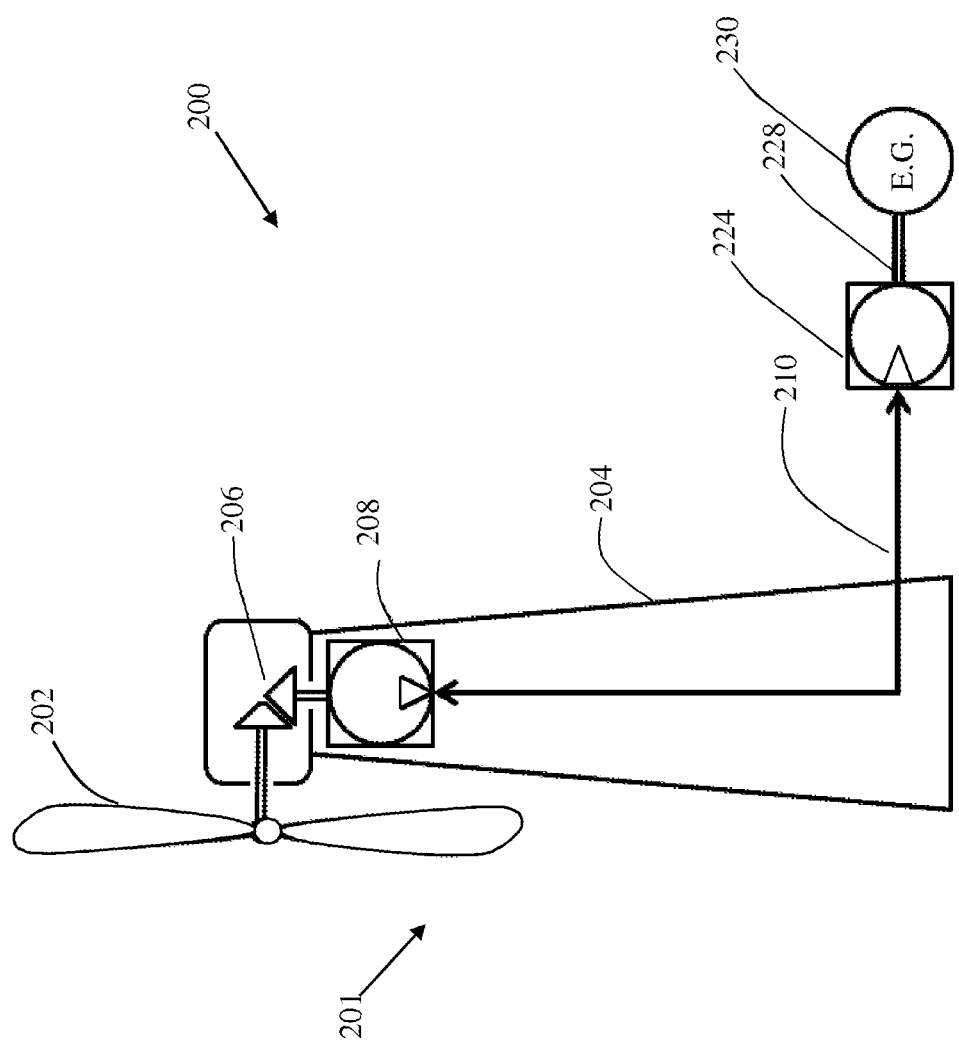
FIG. 2 is a diagrammatic representation of the wind power generation system of FIG. 1 depicting main components of the system.

Referring to FIG. 2, a schematic of a wind power generation system 200 is provided. The system includes a wind turbine tower 201, a fluid line 210, a fluid motor 224, a mechanical coupling 228, and an electric generator 230. The wind turbine tower 201 includes blades 202, a tower structure 204, a transmission 206 disposed atop the tower 204, and a fluid pump 208. The blades are connected to the transmission 206 which is coupled to the fluid pump 208. The fluid pump 208 is fluidly coupled to the fluid motor 224 via the fluid line 210. The fluid line 210 is shown as a bidirectional line to indicate a forward path from the fluid pump 208 to the fluid motor 224 and as well as a return path. Fluid pump 208 includes an input port that is fluidly coupled to the return path, and an outlet port that is fluidly coupled to the forward path. The fluid motor is mechanically coupled to the electric generator 230 via the mechanical coupling member 228. Fluid motor 224 and electrical generator 230 are positioned proximate to the base of the wind turbine tower 201.

Figure 3:
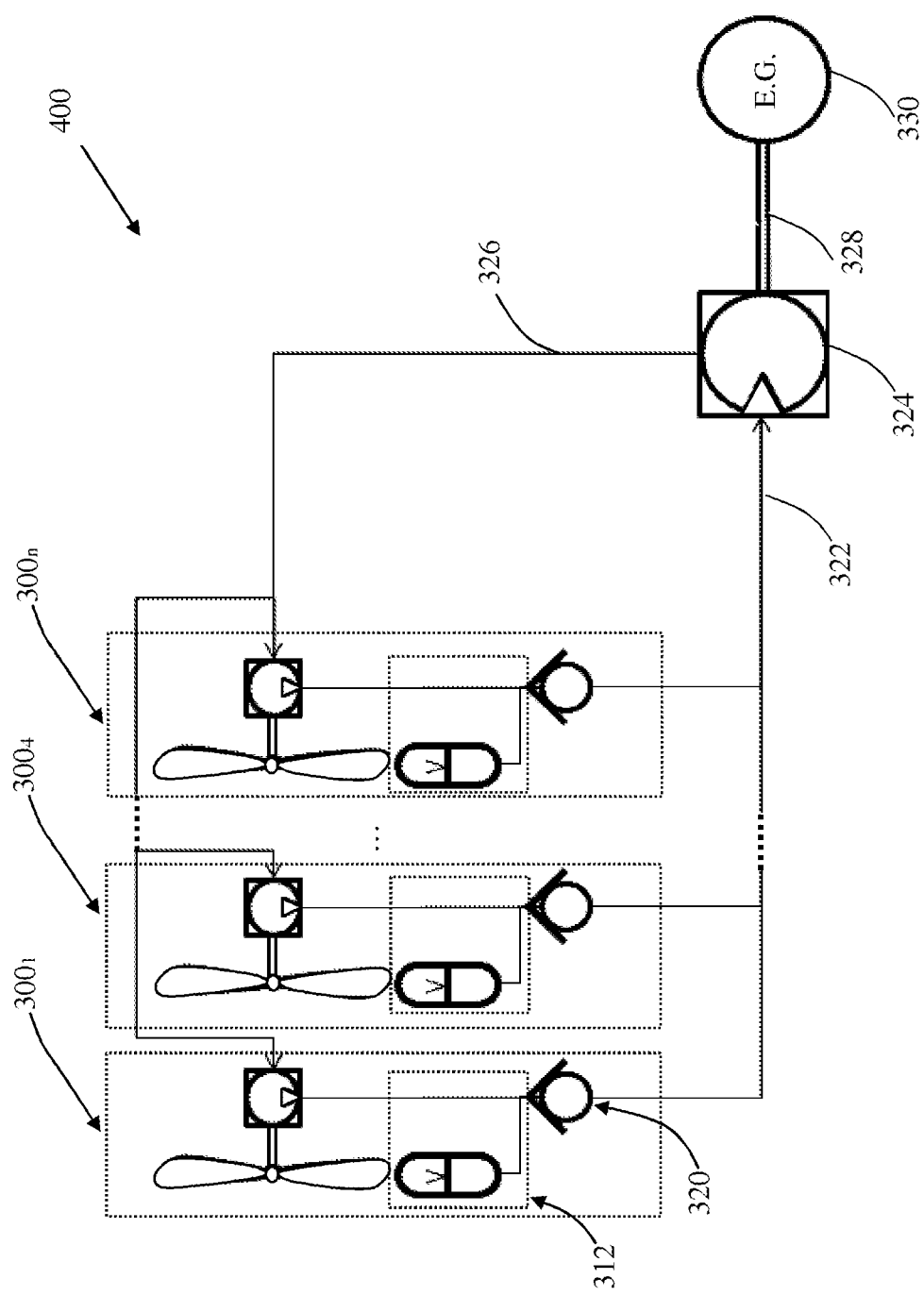
FIG. 3 is a diagrammatic representation of a network of wind power generation systems.

Referring to FIG. 3, a network 400 of wind power generation systems is depicted. Shown are systems $300_i$, e.g., $300_2$, $300_4$, through $300_n$. Also shown corresponding to each system 300; are fluid buffering circuits 312 and check valves 320. A fluid line 322 integrates fluid from each system and provides the integrated fluid to common fluid motors 324. A fluid return line 326 returns low pressure fluid back to the systems $300_i$. A mechanical coupling member 328 couples the fluid motor 324 to the electric generator 330. As seen in FIG. 3, the systems 300 are fluidly coupled to a common forward fluid path, seen here as fluid line 322, that enables each system 300 to pump fluid to the fluid motors 324. The systems 300 receive fluid from a common return fluid line 326. Each of the systems 300 and fluid pumps in each system may share the fluids from other pumps and wind turbines to improve the efficiency of electrical power generation. Additionally, multiple networks of wind generation systems such as network 400 may be fluidly coupled to share fluid and increase total electrical power generation.

The compressed fluid inside the fluid line 322 transmits the generated power of several systems $300_i$ to the fluid motor 324. Use of the fluid buffering circuits 312 and the check valves 320 reduces pressure fluctuations resulted from the fluctuation in rotation of the blades of each system $300_i$. The reduced pressure fluctuations results in reduced flickering of electric current generated by the electric generator 330.

In a conventional wind turbine system, one electric generator is placed atop each respective tower. The electric generators are heavy and thus require more powerful yaw controllers as compared to the yaw controllers used with the components of the instant application as well as more inefficient tower construction, as described below. In accordance with FIG. 3, the central electric generator 330 can be placed remote to each system $300_i$. Therefore, the top portions of the towers can be made with substantially reduced mass. As a result, the yaw controller, not shown, can be simpler and can more efficiently and quickly control the direction at which the blades face the incident wind. The yaw controller alters the direction of the wind turbine toward the incident wind. In addition, the yaw controller can rotate the entire compartment atop of the wind tower. Furthermore, a pitch angle control mechanism may also be provided for controlling the pitch of the blades. The weight reduction of the tower due to the remote location of the electric generator can advantageously result in simple tower construction, i.e., a shallower foundation and thinner gauge material used in the construction of the tower.

Therefore, while each system 300; includes components not present in a conventional wind turbine, e.g., the fluid pump (reference numeral 208 in FIG. 2), the fluid buffering circuit 312, the check valve 320, and while the network 400 includes the fluid motors 324 which is also not present in a conventional wind turbine, reduction of the number of electric generators from one electric generator per wind turbine to two electric generator, one main and one auxiliary generator, for a cluster of systems $300_i$, provide a more efficient network. This extra efficiency is achieved by eliminating weight and cost associated with each electric generator as well as components necessary to integrate electric power that is generated by each electric generator.

Figure 4:
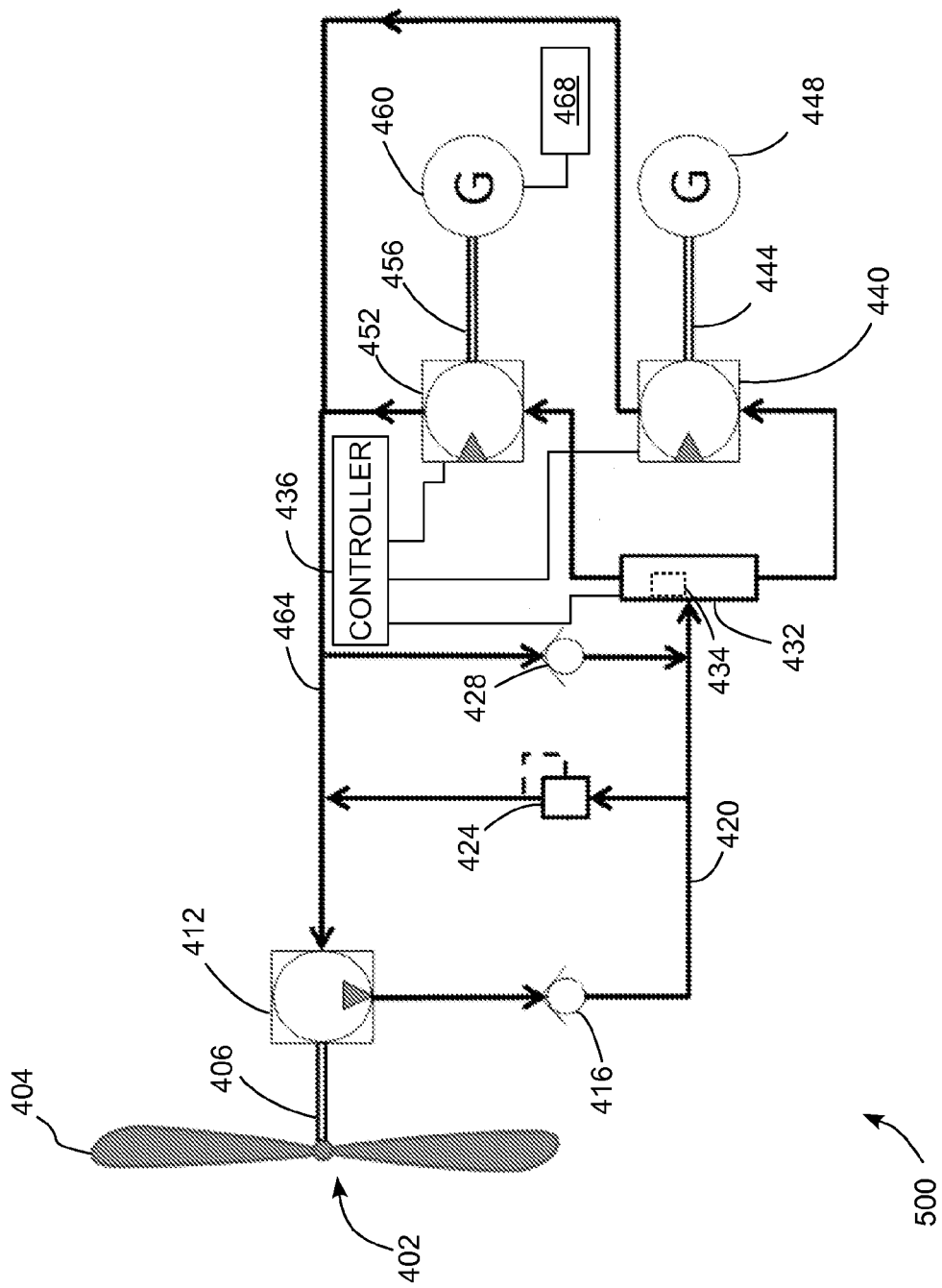
FIG. 4 is a schematic diagram of an alternative embodiment of a wind power generation system.

FIG. 4 depicts a schematic diagram of a wind energy conversion system 500. System 500 includes a wind turbine 402 having at least one blade 404, and a drive shaft 406; a fluid pump 412, forward check valve 416, pressure relief valve 424, security check valve 428, proportional flow valve 432, controller 436, primary fluid motor 440, primary generator 448, auxiliary fluid motor 452, and auxiliary generator 460. Drive shaft 406 mechanically couples the fluid pump 412 to the blades 404 of the wind turbine 402, although alternative embodiments may include various gear and transmission systems to couple the turbine 402 and the fluid pump 412. Drive shaft 406 rotates in response to a wind blowing over the blades 404. The fluid pump 412 has an input port to receive fluid from a return path 464 at a first pressure, and pumps the fluid through an output port at a second, higher pressure into a forward fluid path 420. The magnitude of the pressure that the fluid pump 412 applies to the fluid depends, at least in part, on the mechanical energy that the wind turbine 402 generates. Thus, the amount of pressure that the fluid pump 412 applies to the fluid may vary in response to changes in mechanical energy that the wind turbine 402 generates during operation. FIG. 4 depicts a single wind turbine 402 and fluid pump 412, but the system 500 may include multiple wind turbines coupled to the forward fluid path 420 to drive the primary fluid motor 440 and auxiliary fluid motor 452 in an arrangement similar to that of FIG. 3.

Fluid flows through hydraulic pump 412 at the second, higher pressure into the forward fluid path 420. A check valve 416 is positioned in the fluid path 420 to prevent the higher pressure fluid in the forward path 420 from flowing back to the fluid pump 412. This reverse flow may occur in situations where the wind turbine 402 is idle or generates insufficient mechanical energy to enable the fluid pump 412 to apply higher pressure to fluid supplied from the return path 464. A pressure relief valve 424 is fluidly coupled to the forward path 420 and return path 464. The pressure relief valve 424 enables a portion of the fluid in the forward fluid path 420 to flow into the return path 464. The pressure relief valve opens in response to a difference in pressure between the fluid in the forward path 420 and the return path 464 exceeding a predetermined threshold. In operation, the pressure relief valve opens to prevent transient pressure increases caused by wind gusts from increasing the fluid pressure in the forward path 420 beyond operational limits. A security check valve 428 is fluidly coupled between the return path 464 and forward path 420. The security check valve 428 is configured to open only in situations where the pressure in the return path 464 exceeds the pressure in the forward path 420. This type of pressure fluctuation may occur in the event of a mechanical failure in the wind turbine 402 or fluid pump 412. Since the system 500 may include multiple wind turbines, security check valve 428 opens to isolate the fluid path leading to the fluid pump that is coupled to the failed wind turbine while enabling the system 500 to continue operating with the remaining wind turbines.

Forward path 420 supplies pressurized fluid to the proportional flow valve 432. Proportional flow valve 432 is fluidly coupled to the primary fluid motor 440 and auxiliary fluid motor 452. A mechanical coupling 444 couples primary fluid motor 452 to a primary generator 448. Fluid from the proportional fluid valve 432 drives the primary fluid motor 440 to rotate the mechanical coupling 444. In the embodiment of system 500, mechanical coupling 444 is a drive shaft, but various gears and transmission systems may couple fluid motor 440 to the generator 448 as well. The primary generator 448 generates electric current in response to the rotation of the mechanical coupling 444, seen here as an output drive shaft. The fluid provided to an input port of the primary fluid motor 440 at a higher pressure performs mechanical work in driving the fluid motor 444, and flows through an output port of the primary fluid motor 440 into the return path 464 at a lower pressure than the pressure supplied in the forward path 420. A mechanical coupling 456 couples the auxiliary fluid motor 452 to the auxiliary electrical generator 460, and the auxiliary fluid motor 452 and generator 460 operate in a similar manner to the primary fluid motor 440 and generator 448. In the embodiment of system 500, the primary fluid motor 440 has a volumetric displacement that is approximately five times larger than the auxiliary fluid motor 452, and various configurations of the system 500 may employ motors of different relative volumetric displacements.

The proportional flow valve 432 directs a portion of the fluid in the forward path 420 to the primary fluid motor 440 and the auxiliary fluid motor 452. The mechanical power output of the primary fluid motor 440 and auxiliary fluid motor 452, and corresponding changes in rotational rates of the mechanical couplings 444 and 456, are determined at least in part by the proportion of fluid supplied to each motor. Thus, the proportional flow valve 432 may control the rotational rates of the each of the fluid motors by adjusting the proportion of fluid from the forward path 420 supplied to each motor. In the embodiment of system 500, proportional flow valve 432 includes one or more sensors 434, including flow sensors and pressure sensors that generate signals corresponding to the flow rate and pressure, respectively, of fluid entering the proportional flow valve 432. Alternative embodiments may position flow rate and pressure sensors at various locations in the forward fluid path 420, return fluid path 464, and wind turbines 402. The flow rate increases and decreases with respective increases and decreases in fluid pressure in the forward path 420. The primary fluid motor 440 and secondary fluid motor 452 each include a rotational sensor that generates a signal corresponding to the rate of rotation of the mechanical coupling connected to each motor. Controller 436 is coupled to the proportional flow valve 432, the primary fluid motor 440, and auxiliary fluid motor 452. Controller 436 receives the signals corresponding to the fluid flow through the proportional flow valve 432, and the rotational velocity signals from the primary fluid motor 440 and secondary fluid motor 452. The proportional flow valve 432 adjusts the proportions of the fluid in the forward fluid path 420 that are provided to in response to signals generated in the controller 436. In the example of FIG. 4, controller 436 generates a pulse width modulated (PWM) signal that has a duty cycle corresponding to the proportions of fluid from the input port that the proportional flow valve 432 should direct to each of the fluid motors. Controller 436 may change the duty cycle of the PWM signal, and proportional flow valve 432 adjusts the proportions of fluid flow between each fluid motor accordingly.

Controller 436 may be implemented with general or specialized programmable processors that execute programmed instructions. The instructions and data required to perform the programmed functions may be stored in memory associated with the processors or controllers. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 436 may also include a memory used for storing program instructions and for storing data collected from the sensor 434 in the proportional flow valve 432 and the rotational sensors in the primary fluid motor 440 and auxiliary fluid motor 452.

In system 500, controller 436 implements a proportional-integral (PI) feedback control system to generate signals for the proportional flow valve 432. In general, a PI control system adjusts at least one operating parameter of a system to maintain a system output at a predetermined level and to correct deviations from the predetermined set point output level. In system 500, the PI control system is configured to control the proportion of fluid passing through the proportional flow valve 432 to enable the primary fluid motor 440 to operate at a constant mechanical power level. In system 500, primary generator 448 provides a constant load to the primary motor 440, and the mechanical power output of the primary fluid motor 440 corresponds to the rotational rate of the mechanical coupling 444. Thus, controller 436 is configured to adjust the proportional flow valve 432 to enable the primary fluid motor 440 to rotate the mechanical coupling 444 at a substantially constant set point rotational velocity. In one embodiment the mechanical coupling 444 rotates at a rate of 700 rotations per minute (rpm). The primary generator 448 generates electric voltage at a correspondingly constant frequency level. The primary generator 448 generates electric current in response to the mechanical power output of the primary fluid motor 440.

In operation, controller 436 receives signals indicating the rotational rates of the mechanical couplings for the primary fluid motor 440. The pressure and flow rate through the forward path 420 may change in response to changes in the speed and direction of wind driving the wind turbine 402. The controller identifies the mechanical coupling rotation velocity of the primary fluid motor 440. If the identified rotational velocity is either higher or lower than the set point rotational velocity, the controller generates a signal and sends the signal to the proportional flow valve 432 to adjust the proportion of the flow in the forward path 420 that is supplied to the primary fluid motor 440. The controller 436 directs the proportional flow valve 432 to supply a greater proportion of fluid to the primary motor 440 when the rotational velocity is below the set point, and a lesser proportion when the rotational velocity is above the set point. The controller determines the magnitude of change in the proportional flow rate with respect to the proportion of error (P) and an integration of the magnitude of error over a previous time period (I). The proportion of the error refers to the magnitude of the difference between the detected rotational velocity of the drive mechanism 444 and the set point rotational velocity. The integration refers to identified errors in the mechanical power output of the primary fluid motor 444 over an earlier time period where the controller 436 may store the previous errors in a memory. The control system implements the PI system according to the following equation:

$$K = (K_P V_e + K_I \int V_e)$$

Where $V_e$ represents the rotational speed error of the mechanical coupling 444 of the primary fluid motor 440, $K_P$ is an empirically determined gain factor associated with the proportional magnitude of the error in the rotational speed, and $K_i$ is an empirically determined gain factor associated with the magnitude of errors identified over a previous time period.

In some embodiments, the controller 436 may adjust the proportional flow valve 432 with respect to the flow rate identified in the forward flow path 420. For example, if the overall flow rate indicates that fluid in the forward path is near a maximum operating pressure level for the system 500, then comparatively smaller adjustments to the proportional flow valve 432 produce a given change in the mechanical power output of the primary fluid motor 440. When the flow rate in the forward path 420 indicates a lower pressure in the forward path, a comparatively larger adjustment to the proportional flow valve 432 produces the given change in the mechanical power output of the primary fluid motor 440. Flow rate and pressure sensors including sensors 434 may indicate how much power is being transferred from the wind turbine 402 to the primary generator 448 and secondary generator 460. Additionally, various faults in the wind turbine 402 and other system components produce changes in fluid pressure and flow rates, and controller 436 may use the signals generated by sensors 434 to diagnose faults in the system 500.

The controller 436 may monitor variations in the rotational velocity of the mechanical coupling 456 of the auxiliary motor 452. These variations indicate the variability of the fluid pressure in the forward fluid path 420 to enable the controller to predict the potential changes in pressure in the forward fluid path 420. Controller 436 adjusts the proportion of flow to maintain a predetermined level of the voltage frequency for the primary fluid motor 440. Thus, the auxiliary fluid motor 452 receives a variable flow of fluid from the forward path 420, and may generate variable mechanical power output levels that in turn generate varying amplitudes of electrical current from the auxiliary generator 460. The second generator 452 may generate unregulated electrical energy that is stored in an energy storage device 468, such as a battery. The stored energy may be used to pump the fluid to the primary fluid motor 440 and the primary generator 448 to enable the fluid to flow to the wind turbine 402 during periods of low wind speed or calm conditions. The controller 436 may monitor the variations in output power of the auxiliary motor 452 and auxiliary generator 460 to identify mechanical vibrations present in the wind turbine that generate corresponding variations in the fluid pressure level in the forward path 420. The auxiliary fluid motor 452 also removes mechanical energy from the fluid diverted from the primary fluid motor 440. This removal of mechanical energy dampens the magnitude of transient pressure changes and the effects of turbine vibration in the fluid path and reduces fluid turbulence in the fluid return path 464.

The components indicated in the FIGS. 1-4 may be used for gaseous media as well as liquid media. The fluid described in the foregoing embodiments may be a liquid media such as a hydraulic oil. While most liquids are incompressible, gases are not. While the wind turbines described herein are depicted having two blades, various wind turbine configurations including single blade and multi-blade configurations, as well as any device configured to drive a pump using wind energy may be used.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A wind power electrical power generation system comprising:
a fluid pump having an input port and an output port;
a rotating blade mechanically connected to the fluid pump, the rotating blade and fluid pump being configured to operate the fluid pump to move fluid from the input port to the output port in response to rotation of the rotating blade;
a proportional flow valve fluidly coupled to the output port of the fluid pump, the proportional flow valve being configured to divert a first portion of the fluid from the output port to a first fluid motor and a second portion of the fluid from the output port to a second fluid motor;
the first fluid motor fluidly being coupled to the proportional flow valve;
the second fluid motor fluidly being coupled to the proportional flow valve and configured in parallel with the first fluid motor;
a first electrical generator mechanically coupled to the first fluid motor;
a second electrical generator mechanically coupled to the second fluid motor; and
a proportional integral controller operatively connected to the proportional flow valve and configured to operate the proportional flow valve with reference to a difference between a set point for a parameter for the first fluid motor and a signal indicative of a current value for the parameter for the first fluid motor to enable the first fluid motor to operate at a predetermined rotational speed in response to the first portion of the fluid from the proportional flow valve while the second fluid motor operates at a varying rotational speed in response to the second portion of the fluid from the proportional flow valve.

2. The system of claim 1 wherein the parameter for the first fluid motor is a rotational speed of the first fluid motor.

3. The system of claim 1 wherein the proportional integral controller is configured to generate a pulse width modulated signal with reference to the difference between the set point for the parameter for the first fluid motor and the signal indicative of the current value for the parameter for the first fluid motor.

4. The system of claim 1 wherein the proportional flow valve diverts fluid flowing from the output of the fluid pump to the first fluid motor and the second fluid motor with reference to a signal received from the proportional integral controller.

5. A wind power electrical power generation system comprising:
a first fluid pump having an input port and an output port;
a first rotating blade mechanically connected to the first fluid pump, the first rotating blade and the first fluid pump being configured to operate the first fluid pump to move fluid from the input port to the output port in response to rotation of the first rotating blade;
a second fluid pump having an input port and an output port;
a second rotating blade mechanically connected to the second fluid pump, the second rotating blade and the second fluid pump being configured to operate the second fluid pump to move fluid from the input port to the output port in response to rotation of the second rotating blade;
a proportional flow valve fluidly coupled to the output port of the first fluid pump and to the output port of the second fluid pump, the proportional flow valve being configured to divert a first portion of the fluid from the output ports of the first fluid pump and the second fluid pump to a first fluid motor and a second portion of the fluid from the output ports of the first fluid pump and the second fluid pump to a second fluid motor;

the first fluid motor fluidly being coupled to the proportional flow valve;

the second fluid motor fluidly being coupled to the proportional flow valve and configured in parallel with the first fluid motor;

a first electrical generator mechanically coupled to the first fluid motor;

a second electrical generator mechanically coupled to the second fluid motor; and a proportional integral controller operatively connected to the proportional flow valve and configured to operate the proportional flow valve with reference to a difference between a set point for a parameter for the first fluid motor and the second fluid motor, a signal indicative of a current value for the parameter for the first fluid motor, and a signal indicative of a current value for the parameter for the second fluid motor to enable the first fluid motor to operate at a predetermined rotational speed in response to the first portion of the fluid from the proportional flow valve while the second fluid motor operates at a varying rotational speed in response to the second portion of the fluid from the proportional flow valve.

6. The system of claim 5 wherein the parameter for the first fluid motor and the second fluid motor is a rotational speed of the first fluid motor and the second fluid motor.

7. The system of claim 5 wherein the proportional integral controller is configured to generate a pulse width modulated signal with reference to the difference between the set point for the parameter for the first fluid motor and the second fluid motor, the signal indicative of the current value for the parameter for the first fluid motor, and the signal indicative of the current value for the parameter for the second fluid motor.

8. The system of claim 5 wherein the proportional flow valve diverts fluid flowing from the output port of the first fluid pump and the output port of the second fluid pump to the first fluid motor and the second fluid motor with reference to a signal received from the proportional integral controller.

9. The system of claim 5 wherein the output port of the first fluid pump and the output of the second fluid pump are connected in series to the proportional flow valve.

* * * * *